US009148565B2

(12) United States Patent
Glasse (10) Patent No.: US 9,148,565 B2
(45) Date of Patent: Sep. 29, 2015

(54) METHODS AND APPARATUS FOR PANORAMIC AFOCAL IMAGE CAPTURE

(76) Inventor: Jeff Glasse, New York, NY (US)

( * ) Notice: Subject to any disclaimer, the term of this patent is extended or adjusted under 35 U.S.C. 154(b) by 339 days.

(21) Appl. No.: 13/564,975

(22) Filed: Aug. 2, 2012

(65) Prior Publication Data

US 2013/0194382 A1    Aug. 1, 2013

Related U.S. Application Data

(60) Provisional application No. 61/514,377, filed on Aug. 2, 2012.

(51) Int. Cl.
*H04N 5/232* (2006.01)
(52) U.S. Cl.
CPC .................................. *H04N 5/23238* (2013.01)
(58) Field of Classification Search
CPC .............. H04N 5/232; H04N 5/23212; H04N 5/23238; H04N 5/23293; H04N 5/23296; H04N 5/2254; H04N 5/2257; H04N 5/335; H04N 9/045; H04N 5/23216; H04N 5/23287

USPC .............. 348/36, 37; 359/725–727, 730, 731, 359/733–736, 672, 673, 675, 863

See application file for complete search history.

(56) References Cited

U.S. PATENT DOCUMENTS

| 7,245,443 | B2* | 7/2007 | Togino ........................... 359/725 |
| 7,408,703 | B2* | 8/2008 | Matsuki et al. ............... 359/365 |
| 2011/0085021 | A1* | 4/2011 | Wang et al. ..................... 348/36 |
| 2012/0262540 | A1* | 10/2012 | Rondinelli et al. ............. 348/36 |

* cited by examiner

*Primary Examiner* — Trang U Tran
(74) *Attorney, Agent, or Firm* — Joseph P. Kincart, Esq.; Camille A. Highman, Esq.; Ideation Law, PLLC (57) ABSTRACT

The present invention includes a panoramic imaging system for projecting a 360 degree cylindrical field of view onto a two-dimensional annular format using a panoramic imaging block with a concentric axis 5 of symmetry, two refractive surfaces and two reflective surfaces, and an additional aspheric lens for mitigating aberrations inherent in refractive and reflective lenses.

19 Claims, 7 Drawing Sheets

METHODS AND APPARATUS FOR PANORAMIC AFOCAL IMAGE CAPTURE

CROSS REFERENCE TO RELATED APPLICATIONS

The present application claims priority to Provisional Patent Application Ser. No. 61/514,377 entitled: Panoramic Afocal Attachment, and filed Aug. 2, 2012, the contents of which are relied upon and incorporated herein by reference.

TECHNICAL FIELD

This present invention relates to a panoramic imaging system for capturing a 360 degree cylindrical field of view of image data via a two-dimensional annular format. In particular, it relates to panoramic imaging methods and apparatus that may be implemented via a handheld imaging system.

BACKGROUND

Mobile handsets, such as cellular phones, are increasingly popular. Many cellular phones include image capture functionality. Generally, the image capture functionality is based upon charged coupled device ("CCD") camera technology. Optical lenses included in cellular phones are generally static lenses, which may or may not include some magnification properties. Software is then used to manipulate a captured image and store or post process captured image data. A Field of View ("FOV") is generally limited by the image lens and the flat surface of the CCD.

The use of optical arrangements to facilitate panoramic viewing have been known to use a variety of configurations, including catadioptric lenses and purely refractive lenses, of various shapes and sizes. Generally, a single panoramic block is configured such that light entering it undergoes a two refractions and two reflections before exiting. Both reflective surfaces are paraboloidal in shape and achieve high quality imagery. Each of these surfaces can be replaced with a surface having a radius of the "best fit" sphere for an acceptable image quality of a still image.

However, utilization of paraboloidal reflective surfaces in combination with a telecentric exit pupil may compromise a resulting performance of a design of an overall system rather than enhance it. Some optical configurations work better with spherical reflective surfaces as compared with paraboloidal reflective surfaces. Further, previously known systems have not addressed the use of a means to transfer an intermediate image onto a camera lens Accordingly, there is still a need for a lens or optical block that can be coupled with a camera lens, such as, for example, a cellular device. The cellular device may include for example, a smartphone, and android, an iPhone™, an iPad™, and a tablet computer. In some embodiments, the present invention provides high resolution panoramic imaging that achieves or nearly achieves a diffraction limited system.

SUMMARY OF THE INVENTION

Accordingly, the present invention provides methods and apparatus for capturing panoramic image data via a handheld device, such as a smartphone, an iPhone™ or handheld camera system.

The present invention includes a series of refractive and reflective lenses formed into an optical block. The optical block may be snapped, or otherwise removeably and/or fixedly attached to a smartphone or other device including a camera, such as a CCD camera.

The optical block forms a panoramic image in an annular shape that may be projected into a camera lens on the camera. The panoramic image may be post processed to form a more user friendly image or series of images or video.

DETAILED DESCRIPTION

The present invention provides for an optical system and software for 360 degree image capture via a handheld device, such as a smartphone. The optical system may include, for example, a panoramic black and a relay system. The panoramic block includes optical lenses placed proximate to an image capture device included in the smartphone. The optical lenses may include one or both of: refract and reflect light directed into the image capture system included in the handheld device and thereby capture a 360-degree panoramic field of view with a single image capture device included within the smartphone. In some embodiments, the present invention may be used to adapt commercially available cameras (e.g., the cameras built into many cellular telephones) to function as panoramic image or video capture devices.

In one aspect of the present invention, a relay system following a primary component comprising a panoramic block may be functional to transfer an intermediate image, formed within a primary block on to a CCD camera to produce a real accessible image one the CCD camera Some implementations may include a panoramic lens with one or both of: refractive and reflective lens surfaces. A relationship between various surfaces of a panoramic lens may be a complex one. Many variations of one or both of the refractive and reflective lens surface designs may exist including designs in which the surfaces, either the refractive or reflective ones, are aspheric, including, for example, one or more of: an ellipsoidal surface, a paraboloidal surface, a hyperboloidal surface or an oblate spheroidal surface. In some implementations, it may be possible to achieve excellent image quality using a combination whereby two refractive surfaces and two reflective surfaces are substantially spherical.

Figure 1:
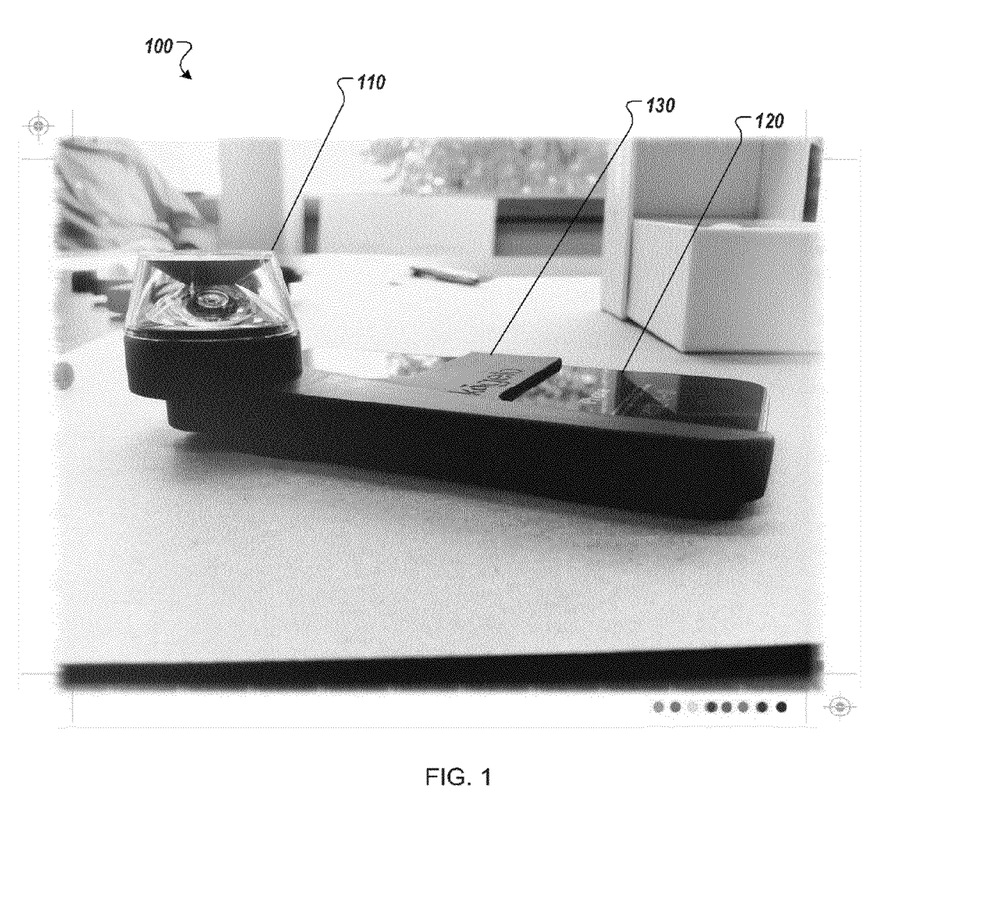
FIG. 1 is a perspective view of an exemplary panoramic image capture system.

Referring now to FIG. 1, a perspective view of an example panoramic image capture system 100 may include, for example a panoramic optical block 110 and a camera 120. In the illustrated example, a camera 120 may be incorporated into a handheld device, such as a smartphone. However, additional embodiments of a camera 120 may include any appropriate form of camera to which a lens set, including matched reflective and refractive lenses may be held in place proximate to an image capture apparatus, such as a CCD camera.

The panoramic optical block 110 may include one or more refractive surfaces and one or more reflective surfaces that capture a substantially 360 degree field of view about a captured plane. In some preferred embodiments, the captured plane is substantially perpendicular to the camera 120; however other captured planes may be captured by appropriately aligned refractive and reflective surfaces. Examples of a panoramic optical block 110 are further discussed below in the descriptions of FIGS. 3-8. The optical block 110 may also include relay optics or relay lenses for transferring an intermediate image onto a camera lens.

According to the present invention, an optical block 110 may be fixedly and removeably coupled to a camera 120 via a coupler 130. A coupler 130 may be formed to position the optical block 110 in front of a lens (not illustrated) included with the camera 120. In the illustrated example, a coupler 130 is formed as a case or jacket for a handheld device, such as a smartphone, and specifically an iPhone™.

Figure 2A:
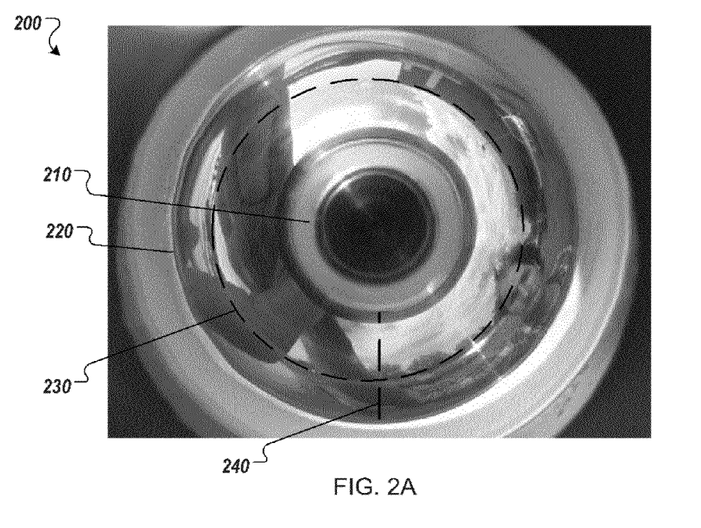
FIG. 2A is an exemplary panoramic image as captured through an optical block.

Referring now to FIG. 2A, an example panoramic image 200 captured through an exemplary optical block is illustrated. As depicted in FIG. 2, a panoramic image 200 may be an image provided by an optical block 110 and captured by the camera 120.

In general, the captured panoramic image 200 is a "warped" image as compared to an image perceived by a human via a human ocular system. The panoramic image 200 includes a substantially 360 degree panoramic view of an area around the optical block. The 360 degree panoramic view is reflected and refracted into an annular image.

The annular image includes an image ring, the image ring includes an inner edge of the image ring that is located towards a center of the image ring and corresponds to one vertical limit 210 of a visible range of the optical block 110 (e.g., the uppermost limit of the range of view of the optical block 110) and an outer edge of the image ring that corresponds to an outer vertical limit 220 of a visible range of the optical block 110 (e.g., the lowermost limit of the range of view of the optical block 110). A circumference of the annular image ring corresponds to a horizontal field of view 230 of the optical block 110.

Figure 2B:
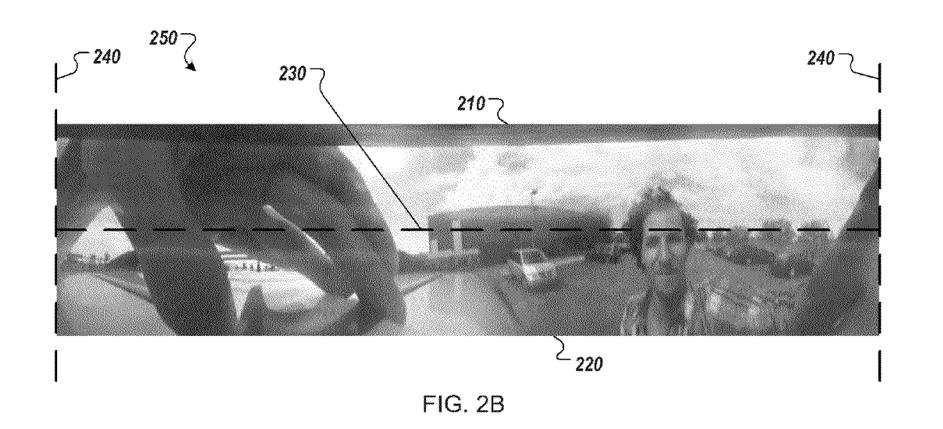
FIG. 2B is an example of a de-warped panoramic image.

Referring now to FIG. 2B an example of a "de-warped" panoramic image 250 is illustrated. In the illustrated example, the de-warped panoramic image 250 is a post image capture processed version of the captured panoramic image 200. In general terms, in the de-warped panoramic image, image data included in a ring of the captured panoramic image 200 is split at a boundary 240 and transformed from a ring to a rectangular shape generally bounded by the boundary 240 at two parallel edges, and by the vertical limits 210 and 220 at an opposite pair of edges.

According to the present invention, image data captured by the camera that includes a representation of the annular image is post processed via an automated processor running executable software. The camera receives rays of light (as discussed further below) and creates image data based upon the rays of light. Post processing allows the generation of the de-warped panoramic view.

Figure 3:
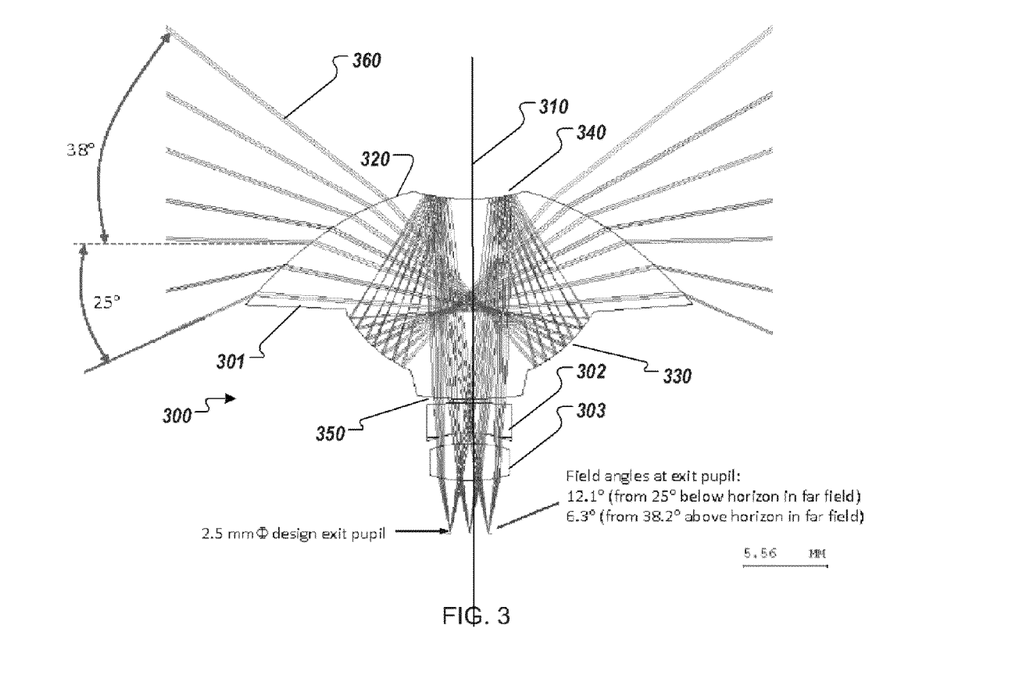
FIG. 3 illustrates an example of an imaging lens.

Referring now to FIG. 3, an example imaging lens 300 that includes multiple elements 301-303, each element 301-303 sharing an axis of symmetry 310 is illustrated. The element 301 has a first refractive conic surface 320, a first reflective conic surface 330, a second reflective conic surface 340, and a second refractive conic surface 350. In some embodiments, a diameter of element 301 can be about 28.5 mm; the distance from a camera pupil to a farthest surface on the lens 300 can be about 22.5 mm.

Some embodiments may also include field angles emerging from element 301 which are incident to the camera (e.g., the camera 120 of FIG. 1) wherein the field angles may be about +/−12.1 degrees maximum and about +/−6.3 degrees minimum. In some embodiments, the field angles may cover a field of view covering about 25 degrees below horizon of the camera to about 38 degrees above horizon of the camera, with a substantially 360 degree azimuth.

In another aspect, in some embodiments, one or more rays of light 360, may enter element 301 at a first refractive conic surface 320 and be refracted to a first reflective conic surface 330. Rays of light 360 may also be reflected onto a second reflective conic surface 340, and in turn be reflected to a second refractive conic surface 350. The rays of light 360 may emerge from the element 301 through the second refractive conic surface 350 and then pass through the elements 302 and 303.

Lenses 302 and 303 may also be included that further refract the rays of light 360. The lenses which further refract the rays of light may be referred to as a "doublet" or a collimator. The doublet may be functional to cause the rays of light 360 to emerge from element 303 in a substantially parallel manner (e.g., the rays substantially do not converge to a focal point), or otherwise referred to as a collimated beam of light.

In some specific implementations, elements 301-303 may be formed of one or both of: acrylic and polycarbonate plastics and may be formed via a molding process. Some embodiments may also include lenses 300 that project a field of view of 360 degrees by approximately 63 degrees onto a two dimensional annular format (e.g., the panoramic image 200 of FIG. 2) coincident with a CCD array, such as a CCD array that may be included in the camera 120 of FIG. 1.

Accordingly, in some embodiments, lenses 300 may function over an equivalent field angle range of about +/−12.1 degrees maximum and about ±6.3 degrees minimum to cover approximately 25 degrees below to approximately 38 degrees above horizon.

Figure 4:
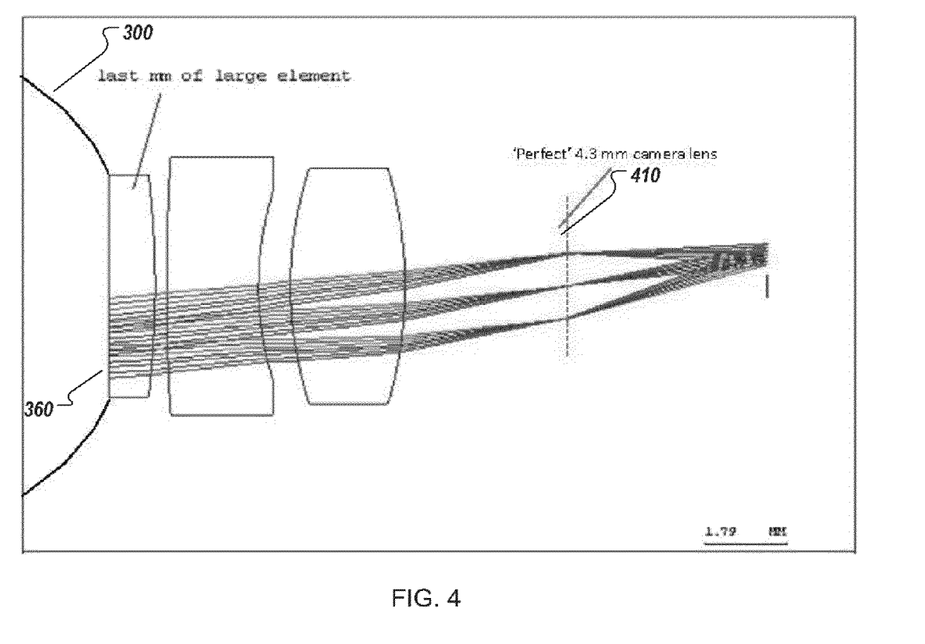
FIG. 4 is an enlarged view of a lens.

Referring now to FIG. 4, an enlarged view of the lens 300 of FIG. 3 is illustrated. As discussed previously, rays 360, emerge from the lens 300 in a substantially parallel manner. The rays are projected onto a lens 410 of the camera 120. The lens 410 may include optics that focus the rays onto a CCD, film, or any other appropriate image receiving apparatus or medium.

Figure 5:
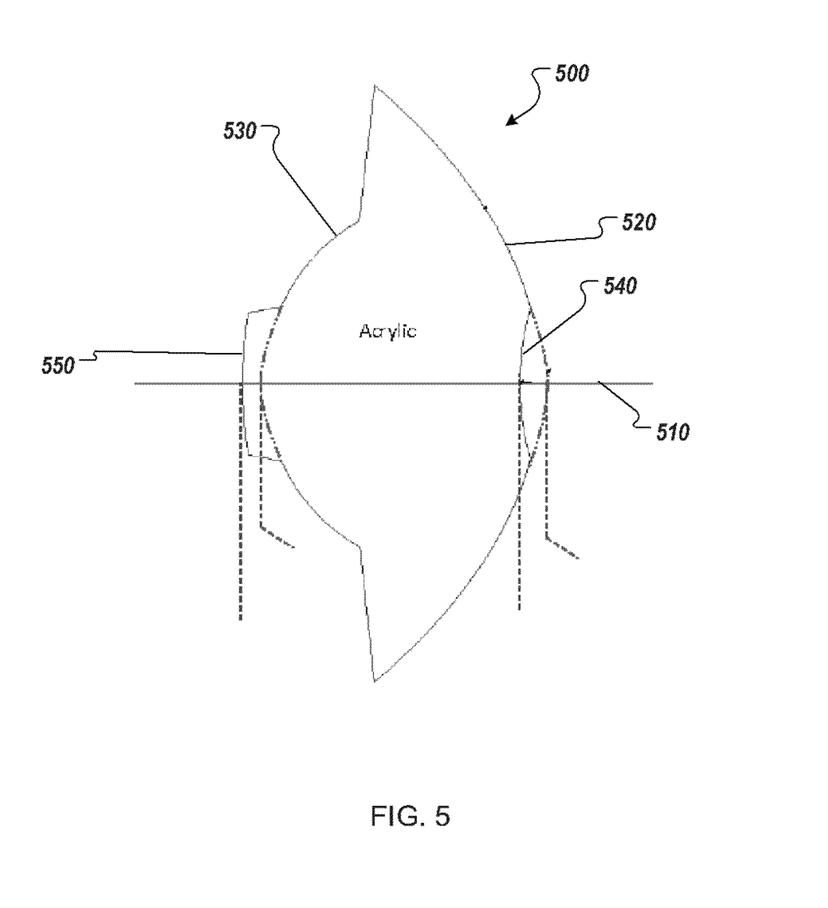
FIG. 5 is a sectional view of an example of a lens element.

Referring now to FIG. 5, a sectional view of an exemplary lens element 500 is illustrated. In some implementations, element 500 may be one and the same as element 301 of FIG. 3. In some embodiments, element 500 may also be formed of an acrylic material. The element 500 may include a radial form about an axis of symmetry 510.

In some specific embodiments, a first refractive conic surface 520 may include a convex surface with a radius of about −14.05964 mm and a K value of about −0.852225. A first reflective conic surface 530 may include a convex surface with a radius of about 9.54611 mm and a K value of about 0.081569.

Some embodiments may also include a second reflective conic surface, 540 including a concave surface with a radius of about 15.70354 mm and a K value of about 10.093278. A second refractive conic surface 550 may include a convex surface with a radius of about 20.0000 mm, a K value of about −1, and an A value of about −0.224068E-03. The second refractive aspheric conic may include a surface 550 which assists to mitigate aberration of the image inherent in refractive and reflective lens designs and helps to provide increased resolution in, for example, high definition panoramic videos and images.

Figure 6:
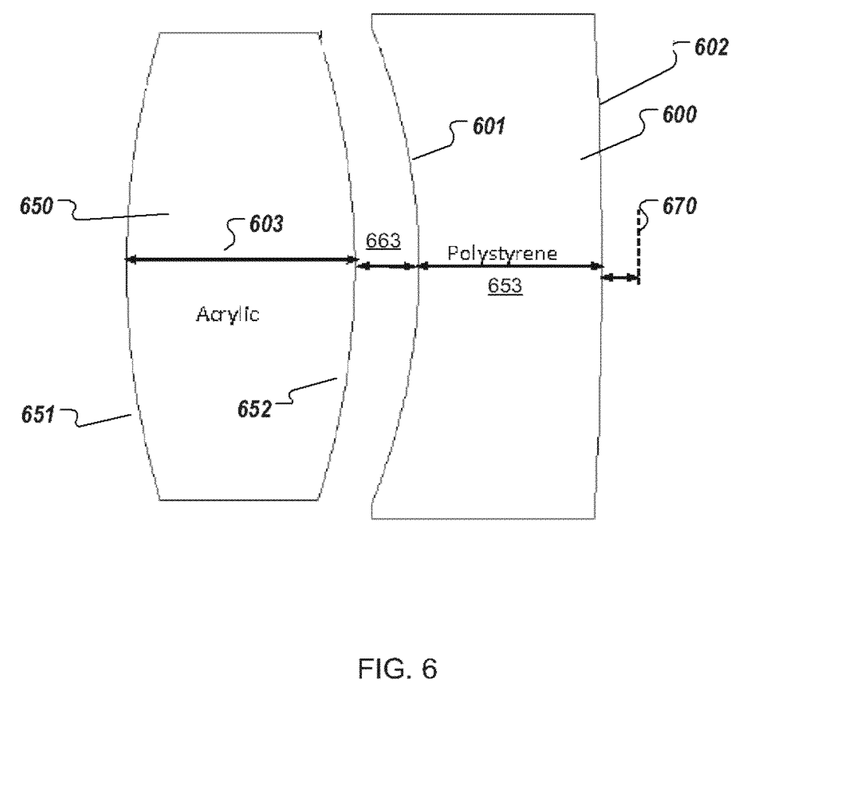
FIG. 6 is a sectional view of an example of a lens element.

Referring now to FIG. 6 a sectional view of an exemplary lens elements 600 and element 650 is illustrated. In some implementations, lens element 600 may be one and the same as element 302 and element 650 may be one and the same as element 303 of FIG. 3. In some specific embodiments, element 650 may be formed of acrylic, and include a refractive surface 651 and a refractive surface 652. The refractive surface 651 and a refractive surface 652 may be spaced apart by a thickness of approximately 2.5000 mm at a radial axis 603. The surface 651 is convex with a radius of approximately 9.34075 mm and an optimum clear aperture (CA) of about 4.10 mm. Surface 652 may be convex with a radius of approximately −8.66763 mm and a CA of about 4.34 mm.

In some embodiments, element 600 may be formed of polycarbonate or polystyrene, and include two refractive surfaces, refractive surface 601 and refractive surface 602. Refractive surface 601 and refractive surface 602 may be spaced apart by a thickness of approximately 2.0000 mm at a radial axis 653. Refractive surface 601 may be concave with a radius of approximately −7.10895 mm and an optimum clear aperture (CA) of about 4.28 mm. Refractive surface 602 may be convex with a radius of approximately −60.000 mm, a K value of about −1, an A value of about −0.301603E-03, and a CA of about 4.48 mm.

Refractive surfaces 652 and 601 may be separated by a distance of about 0.700 mm at a radial axis 663. Surface 602 may be separated from surface 670 by a distance of about 0.25 mm. In some implementations, the surface 670 can be the surface of a camera lens (e.g., the lens of the camera 120 of FIG. 1).

Figure 7:
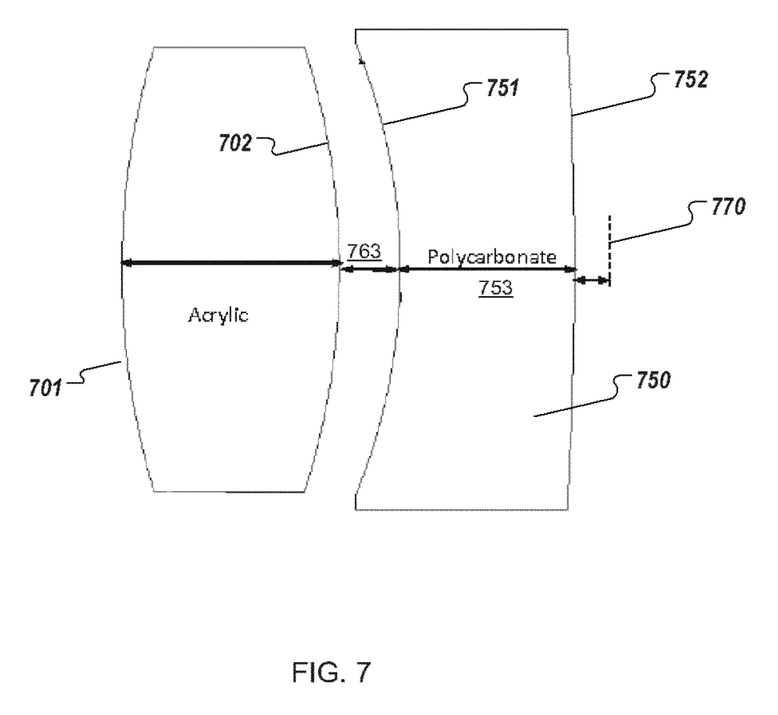
FIG. 7 is a sectional view of another exemplary lens element.

Referring now to FIG. 7, a sectional view of another example lens element 700 is illustrated with an exemplary lens element 750. Exemplary lens element 750 may be formed of polycarbonate, and include a refractive surface 751 and a refractive surface 752. The surfaces 751 and 752 are spaced apart by a thickness of approximately 2.0000 mm at a radial axis 753.

In some embodiments, due to different refractive qualities of respective materials from which lens surfaces 751 and 752 may be formed, for example a polycarbonate lens material, as compared with a polystyrene used to form element 600, the prescriptive geometries of the surfaces 751 and 752 differ from those of surfaces 601 and 602. In some specific examples, surface 751 may be concave with a radius of approximately −7.06945 mm and an optimum clear aperture (CA) of about 4.28 mm. Surface 752 may be convex with a radius of approximately −60.48131 mm, a K value of about −1, an A value of about −0.304357E-03, and a CA of about 4.80 mm.

Surfaces 702 and 751 may be separated by a distance of about 0.700 mm at a radial axis 763. Surface 752 may be separated from surface 770 by a distance of about 0.25 mm. In some implementations, surface 770 may be a surface of a camera lens (e.g., the lens of the camera 120 of FIG. 1).

Apparatus has been described in detail above, corresponding methods for directing light rays onto into a camera lens via the apparatus described above are also within the scope of the present invention. Operation of the camera allows for capture of image data based upon the rays of light directed into the camera.

CONCLUSION

A number of embodiments of the present invention have been described. Nevertheless, it will be understood that various modifications may be made without departing from the spirit and scope of the invention. For example, various lens materials and configurations may be modified to obtain a desired image. In addition, various integration of components, as well as software and firmware may be implemented. Accordingly, other embodiments are within the scope of the following claims.

What is claimed is:

1. A panoramic image capture apparatus for a smartphone comprising a handheld image capture device, the apparatus comprising:
   a panoramic optical block comprising optical refractive lenses and optical reflective lenses;
   a relay system; and
   a coupler for removably positioning the panoramic optical block and the relay system, proximate to a camera in the handheld device, wherein the camera comprises a camera lens and the coupler positions the panoramic optical block and the relay system such that light may pass through the optical refractive lenses and optical reflective lenses into the camera lens, and wherein the panoramic optical block enables the camera to capture a substantially 360° field of view about a captured plane, wherein the captured plane is substantially perpendicular to the camera and parallel the panoramic optical block.

2. The panoramic image capture apparatus of claim 1 wherein the coupler fixedly attaches the panoramic optical block and the relay system to the handheld device.

3. The panoramic image capture apparatus of claim 1 wherein the camera comprises a charged coupled device camera.

4. The panoramic image capture apparatus of claim 1 wherein the handheld device comprises an iPhone™.

5. The panoramic image capture apparatus of claim 1 wherein the camera comprises a charged coupler device that is essentially planar.

6. The panoramic image capture apparatus of claim 5 wherein optical refractive lenses and optical reflective lenses project an annular image onto the charged coupler device.

7. The panoramic image capture apparatus of claim 6 wherein the annular image comprises a substantially 360 degree view of an area around the panoramic optical block.

8. The panoramic image capture apparatus of claim 7 wherein the annular image comprises an inner edge of an image ring comprising a center of the image ring, wherein the inner edge of the ring corresponds to a first vertical limit of a visible range of the optical block.

9. The panoramic image capture apparatus of claim 8 wherein annular image additionally comprises an outer edge of the image ring, wherein the outer edge of the image ring corresponds to an outer vertical limit of the visible range of the panoramic optical block.

10. The panoramic image capture apparatus of claim 1 wherein the optical block further comprises relay optics or relay lenses for transferring an intermediate image onto the camera lens included in the camera.

11. The panoramic image capture apparatus of claim 1 wherein the optical block comprises an imaging lens comprising multiple elements, each element comprising a shared axis of symmetry.

12. The panoramic image capture apparatus of claim 11 wherein a first element of the multiple elements comprising the optical block comprises a first refractive conic surface and a first reflective conic surface.

13. The panoramic image capture apparatus of claim 12 wherein the first element of the multiple elements comprising the optical block additionally comprises a second reflective conic surface and a second refractive conic surface.

14. The panoramic image capture apparatus of claim 13 wherein a diameter of the first element is about 28.5 mm, and a distance from a camera pupil to a farthest surface on the first element is about 22.5 mm.

15. The panoramic image capture apparatus of claim 14, wherein field angles emerging from the first element are generally incident to the camera.

16. The panoramic image capture apparatus of claim 15, wherein the field angles emerging from the first element are about +/−12.1 degrees maximum and about +/−6.3 degrees mm1mum.

17. The panoramic image capture apparatus of claim 16, wherein the field angles comprise a second field of view comprising about 25 degrees below a horizon of the camera to about 38 degrees above the horizon of the camera.

18. The panoramic image capture apparatus of claim 17, wherein the field angles comprise a substantially 360 degree azimuth.

19. The panoramic image capture apparatus of claim 18 wherein one or more rays of light may enter the first element at the first refractive conic surface and be refracted to the first reflective conic surface and also be reflected onto the second reflective conic surface and in turn be reflected to the second refractive conic surface and emerge from the first element through the second refractive conic surface.

* * * * *